United States Patent
Johnson

(10) Patent No.: US 7,925,083 B2
(45) Date of Patent: Apr. 12, 2011

(54) METHOD FOR DIGITAL IMAGE CLASS DETECTION

(75) Inventor: Stephen E. Johnson, Pittsford, NY (US)

(73) Assignee: Eastman Kodak Company, Rochester, NY (US)

(*) Notice: Subject to any disclaimer, the term of this patent is extended or adjusted under 35 U.S.C. 154(b) by 945 days.

(21) Appl. No.: 11/774,739

(22) Filed: Jul. 9, 2007

(65) Prior Publication Data

US 2009/0016643 A1 Jan. 15, 2009

(51) Int. Cl.
*G06K 9/00* (2006.01)

(52) U.S. Cl. ........ 382/162; 382/165; 382/166; 382/167; 382/282

(58) Field of Classification Search ........... 382/162, 382/167, 166, 282, 165; 345/591, 604; 348/279, 348/395.1; 358/518, 1.9
See application file for complete search history.

(56) References Cited

U.S. PATENT DOCUMENTS

| | | | |
|---|---|---|---|
| 5,189,523 A | 2/1993 | Sugiura | 358/300 |
| 5,282,026 A | 1/1994 | Nagata | 358/500 |
| 5,287,204 A | 2/1994 | Koizumi et al. | 358/538 |
| 5,345,320 A | 9/1994 | Hirota | 358/518 |
| 5,392,365 A | 2/1995 | Steinkirchner | 382/22 |
| 5,659,407 A | 8/1997 | Andresen et al. | 358/530 |
| 5,852,501 A | 12/1998 | Maehara et al. | 358/505 |
| 6,249,592 B1 | 6/2001 | Fan et al. | 382/112 |
| 6,580,824 B2 | 6/2003 | Deng et al. | 382/165 |
| 6,788,811 B1 * | 9/2004 | Matsuura et al. | 382/166 |
| 6,934,412 B2 | 8/2005 | Bares | 382/165 |
| 7,116,443 B2 | 10/2006 | Handley et al. | 358/1.9 |

* cited by examiner

*Primary Examiner* — Anh Hong Do
(74) *Attorney, Agent, or Firm* — Justin D. Petruzzelli

(57) ABSTRACT

A system and method for analyzing and classifying digital images as color, black-and-white, black-and-white with spot color, monochromatic, or monochromatic with spot color is provided. According to an embodiment of the present invention, a digital image is received and selected pixel values thereof are transformed from RGB color component values to a lightness component value and two color difference component values. The selected pixels are analyzed with respect to neutrality based upon the two color difference values and are grouped according to lightness value. The sample population distributions of each of the two color difference values are statistically analyzed for each group of pixels, and an image classification is determined by examination of the resulting statistics and derivatives thereof.

12 Claims, 10 Drawing Sheets

| | | | | | | | |
|---|---|---|---|---|---|---|---|
| 44 177 27 | 219 73 109 | 112 128 112 | 239 72 71 | 1 206 11 | 0 210 0 | 255 68 68 | 146 109 146 |
| 65 152 101 | 136 106 157 | 36 146 219 | 109 119 171 | 182 109 36 | 128 108 190 | 133 107 188 | 203 93 79 |
| 52 139 238 | 135 118 125 | 223 62 177 | 109 146 125 | 91 123 196 | 230 74 79 | 149 111 96 | 151 111 86 |
| 100 148 68 | 247 61 126 | 0 182 146 | 71 149 125 | 177 93 127 | 223 71 115 | 144 118 75 | 172 89 145 |
| 146 109 109 | 86 158 19 | 250 75 20 | 36 182 36 | 255 36 219 | 112 128 128 | 57 178 20 | 73 146 146 |
| 128 109 198 | 249 74 54 | 35 191 8 | 123 123 123 | 182 73 219 | 109 109 219 | 58 133 224 | 105 122 151 |
| 150 111 88 | 143 107 132 | 235 66 105 | 12 186 78 | 161 111 79 | 255 73 36 | 187 87 147 | 173 108 79 |
| 145 94 224 | 194 99 65 | 134 116 131 | 8 197 37 | 82 165 2 | 208 98 11 | 253 42 175 | 120 120 120 |

| | | | | | | | |
|---|---|---|---|---|---|---|---|
| 120.13 -52.52 -54.35 | 120.76 -6.67 70.08 | 121.39 -5.30 -6.70 | 121.82 -28.73 83.58 | 122.48 -62.86 -86.71 | 123.27 -69.51 -87.99 | 123.91 -31.60 93.5 | 124.28 12.24 15.50 |
| 120.17 -10.80 -39.37 | 120.78 20.43 10.87 | 121.43 55.09 -60.91 | 121.94 27.69 -9.21 | 122.51 -48.84 42.41 | 123.33 37.62 3.36 | 124.01 36.11 6.44 | 124.29 -25.59 56.13 |
| 124.27 64.20 -51.52 | 123.88 0.63 7.933 | 123.25 30.29 71.19 | 122.40 -48.75 -9.59 | 121.75 41.91 -21.91 | 121.21 -23.86 77.60 | 120.65 -13.92 20.21 | 120.11 -19.26 22.03 |
| 124.53 -31.89 -17.52 | 124.02 1.07 87.74 | 123.48 12.76 -88.08 | 122.94 1.18 -37.06 | 121.99 2.80 39.25 | 121.46 -3.69 72.44 | 120.87 -25.89 16.48 | 120.20 13.97 36.96 |
| 120.06 -6.25 18.5 | 120.63 -57.33 -24.74 | 121.06 -57.08 91.96 | 121.70 -48.33 -61.17 | 122.34 54.49 94.68 | 123.22 2.70 -8.00 | 123.81 -58.55 -47.70 | 124.17 12.33 -36.50 |
| 124.83 41.29 2.29 | 124.05 -39.58 89.12 | 123.49 -65.14 -63.18 | 123 0 0 | 122.24 54.58 42.67 | 121.54 55.00 -8.91 | 120.95 58.17 -44.87 | 120.22 17.37 -10.85 |
| 120.04 -18.09 21.36 | 120.61 6.42 15.98 | 120.98 -9.06 81.34 | 121.66 -24.59 -78.24 | 122.30 -24.45 27.59 | 123.20 -49.26 94.00 | 123.74 13.10 45.14 | 124.13 -25.49 34.85 |
| 124.07 56.38 14.97 | 123.53 -33.06 50.25 | 123.09 4.46 7.78 | 122.25 -48.06 -81.54 | 121.60 -67.47 -28.30 | 120.97 -62.09 62.05 | 120.25 30.84 94.73 | 120 0 0 |

| 144 120 89 | 141 118 88 | 145 120 90 | 144 120 89 | 140 117 88 | 145 120 90 | 141 118 88 | 140 117 88 |
|---|---|---|---|---|---|---|---|
| 140 117 88 | 144 120 89 | 141 118 88 | 140 117 88 | 143 119 89 | 141 118 88 | 145 120 90 | 143 119 89 |
| 145 120 90 | 141 118 88 | 144 120 89 | 143 119 89 | 140 117 88 | 145 120 90 | 140 117 88 | 145 120 90 |
| 143 119 89 | 140 117 88 | 140 117 88 | 145 120 90 | 141 118 88 | 140 117 88 | 144 120 89 | 140 117 88 |
| 143 119 89 | 144 120 89 | 143 119 89 | 144 120 89 | 143 119 89 | 141 118 88 | 140 117 88 | 144 120 89 |
| 140 117 88 | 145 120 90 | 143 119 89 | 145 120 90 | 144 120 89 | 143 119 89 | 144 120 89 | 141 118 88 |
| 144 120 89 | 143 119 89 | 145 120 90 | 141 118 88 | 140 117 88 | 144 120 89 | 145 120 90 | 140 117 88 |
| 141 118 88 | 144 120 89 | 140 117 88 | 145 120 90 | 141 118 88 | 143 119 89 | 140 117 88 | 145 120 90 |

| 123.64 -19.56 14.51 | 121.46 -18.89 13.93 | 124.06 -19.23 14.93 | 123.64 -19.56 14.51 | 120.57 -18.39 13.85 | 124.06 -19.23 14.93 | 121.46 -18.89 13.93 | 120.57 -18.39 13.85 |
|---|---|---|---|---|---|---|---|
| 120.57 -18.39 13.85 | 123.64 -19.56 14.51 | 121.46 -18.89 13.93 | 120.57 -18.39 13.85 | 122.76 -19.06 14.43 | 121.46 -18.89 13.93 | 124.06 -19.23 14.93 | 122.76 -19.06 14.43 |
| 124.06 -19.23 14.93 | 121.46 -18.89 13.93 | 123.64 -19.56 14.51 | 122.76 -19.06 14.43 | 120.57 -18.39 13.85 | 124.06 -19.23 14.93 | 120.57 -18.39 13.85 | 124.06 -19.23 14.93 |
| 122.76 -19.06 14.43 | 120.57 -18.39 13.85 | 120.57 -18.39 13.85 | 124.06 -19.23 14.93 | 121.46 -18.89 13.93 | 120.57 -18.39 13.85 | 123.64 -19.56 14.51 | 120.57 -18.39 13.85 |
| 122.76 -19.06 14.43 | 123.64 -19.56 14.51 | 122.76 -19.06 14.43 | 123.64 -19.56 14.51 | 122.76 -19.06 14.43 | 121.46 -18.89 13.93 | 120.57 -18.39 13.85 | 123.64 -19.56 14.51 |
| 120.57 -18.39 13.85 | 124.06 -19.23 14.93 | 122.76 -19.06 14.43 | 124.06 -19.23 14.93 | 123.64 -19.56 14.51 | 122.76 -19.06 14.43 | 123.64 -19.56 14.51 | 121.46 -18.89 13.93 |
| 123.64 -19.56 14.51 | 122.76 -19.06 14.43 | 124.06 -19.23 14.93 | 121.46 -18.89 13.93 | 120.57 -18.39 13.85 | 123.64 -19.56 14.51 | 124.06 -19.23 14.93 | 120.57 -18.39 13.85 |
| 121.46 -18.89 13.93 | 123.64 -19.56 14.51 | 120.57 -18.39 13.85 | 124.06 -19.23 14.93 | 121.46 -18.89 13.93 | 122.76 -19.06 14.43 | 120.57 -18.39 13.85 | 124.06 -19.23 14.93 |

| 144 120 89 | 141 118 88 | 145 120 90 | 144 120 89 | 140 117 88 | 145 120 90 | 141 118 88 | 140 117 88 |
|---|---|---|---|---|---|---|---|
| 140 117 88 | 144 120 89 | 141 118 88 | 140 117 88 | 143 119 89 | 141 118 88 | 145 120 90 | 143 119 89 |
| 145 120 90 | 141 118 88 | 144 120 89 | 143 119 89 | 140 117 88 | 145 120 90 | 140 117 88 | 145 120 90 |
| 143 119 89 | 140 117 88 | 140 117 88 | 145 120 90 | 141 118 88 | 140 117 88 | 144 120 89 | 140 117 88 |
| 143 119 89 | 144 120 89 | 143 119 89 | 136 106 157 | 36 182 36 | 255 36 216 | 255 73 36 | 144 120 89 |
| 140 117 88 | 145 120 90 | 143 119 89 | 128 108 190 | 57 178 20 | 73 146 146 | 146 109 146 | 141 118 88 |
| 144 120 89 | 143 119 89 | 145 120 90 | 177 93 127 | 35 191 8 | 150 111 88 | 109 109 219 | 140 117 88 |
| 141 118 88 | 144 120 89 | 140 117 88 | 145 120 90 | 141 118 88 | 143 119 89 | 140 117 88 | 145 120 90 |

| 123.64 -19.56 14.51 | 121.46 -18.89 13.93 | 124.06 -19.23 14.93 | 123.64 -19.56 14.51 | 120.57 -18.39 13.85 | 124.06 -19.23 14.93 | 121.46 -18.89 13.93 | 120.57 -18.39 13.85 |
|---|---|---|---|---|---|---|---|
| 120.57 -18.39 13.85 | 123.64 -19.56 14.51 | 121.46 -18.89 13.93 | 120.57 -18.39 13.85 | 122.76 -19.06 14.43 | 121.46 -18.89 13.93 | 124.06 -19.23 14.93 | 122.76 -19.06 14.43 |
| 124.06 -19.23 14.93 | 121.46 -18.89 13.93 | 123.64 -19.56 14.51 | 122.76 -19.06 14.43 | 120.57 -18.39 13.85 | 124.06 -19.23 14.93 | 120.57 -18.39 13.85 | 124.06 -19.23 14.93 |
| 122.76 -19.06 14.43 | 120.57 -18.39 13.85 | 120.57 -18.39 13.85 | 124.06 -19.23 14.93 | 121.46 -18.89 13.93 | 120.57 -18.39 13.85 | 123.64 -19.56 14.51 | 120.57 -18.39 13.85 |
| 122.76 -19.06 14.43 | 123.64 -19.56 14.51 | 122.76 -19.06 14.43 | 120.78 20.43 10.87 | 121.70 -48.33 -61.17 | 122.34 54.49 94.68 | 123.20 -49.26 94.00 | 123.64 -19.56 14.51 |
| 120.57 -18.39 13.85 | 124.06 -19.23 14.93 | 122.76 -19.06 14.43 | 123.33 37.62 3.336 | 123.81 -58.55 -47.70 | 124.17 12.34 -36.50 | 124.28 12.25 15.50 | 121.46 -18.89 13.93 |
| 123.64 -19.56 14.51 | 122.76 -19.06 14.43 | 124.06 -19.23 14.93 | 121.99 2.80 39.25 | 123.49 -65.14 -63.18 | 120.04 -18.09 21.36 | 121.54 55.00 08.91 | 120.57 -18.39 13.85 |
| 121.46 -18.89 13.93 | 123.64 -19.56 14.51 | 120.57 -18.39 13.85 | 124.06 -19.23 14.93 | 121.46 -18.89 13.93 | 122.76 -19.06 14.43 | 120.57 -18.39 13.85 | 124.06 -19.23 14.93 |

METHOD FOR DIGITAL IMAGE CLASS DETECTION

FIELD OF THE INVENTION

This invention relates to a method of classifying a digital image as color, grayscale (black-and-white) or monochromatic. The invention also relates to a method of determining if an image classified as monochromatic or grayscale is likely to contain areas of spot color accents. In particular, the present invention pertains to facilitating the classification of a digital image with reduced or no user interaction.

BACKGROUND OF THE INVENTION

Most color digital images consist of three color components: red, green and blue (RGB). All digital images are divided spatially into discrete picture elements (pixels). For each pixel in a RGB digital image, three digital values, one each for the red, green and blue components, are assigned in proportion to the brightness level of each color component in said pixel. In combination, the relative magnitudes of the digital values for each of the three color components for a pixel describe the overall brightness value and the color hue value of the pixel. If, for a pixel in a digital image, the magnitudes of the red, green and blue digital values for said pixel are equivalent, the pixel is said to be neutral in color hue. If all of the pixels in a digital image are neutral in color hue, the digital image is classified as being grayscale or "black-and-white." If all of the pixels in a digital image have varying brightness levels but have identical or similar color hue values, the digital image is classified as being monochromatic. Traditional sepia tone (reddish-brown to yellowish-brown color hue) images are a subset of the class of monochromatic images.

Digital images are commonly obtained directly from still digital cameras and from hardcopy print or film scanners. Still digital cameras and print or film scanners typically capture digital images in RGB color. Some cameras and scanners offer on-board digital image processing capabilities to convert the original RGB color images to black-and-white and sepia tone images. Likewise, some computer software programs can convert RGB digital images to black-and-white or traditional sepia tone images, as well as to images containing exclusively other primary monochromatic color hues. Furthermore, more advanced computer software programs provide the ability to convert only some regions of a RGB digital image to black-and-white or monochromatic tones, leaving selected key regions of the image in RGB color. Digital images of this type are known as "spot color", "accent color" or "key color" images. When black-and-white digital images, monochrome digital images, or black-and-white or monochromatic digital images with spot color are generated from original RGB digital images, the resulting digital images are often stored in three-channel (RGB) digital image files, indistinguishable in format or structure from other RGB digital image files.

When a RGB digital image file is accessed and utilized by a digital imaging system, it is often desirable to identify the class to which the digital image belongs, (e.g., RGB color, black-and-white, monochromatic, black-and-white with spot color or monochromatic with spot color), so that subsequent digital image processing operations, digital image storage formats or locations and/or image printing operations can be optimized dependent upon the actual image class. Unfortunately, many digital image files that have been originally generated as black-and-white or monochromatic or as original RGB digital images that have been subsequently converted to black-and-white or monochromatic by computer software are stored in RGB image file formats, and they carry no distinction with respect to their actual image class. It is necessary for an observer to manually classify the image into one of said classes by viewing an initial hardcopy print of the image or a softcopy reproduction of the image displayed on a color computer monitor or other such color digital image viewing device.

When large groups of digital images are imported into image archiving and management systems, image enhancement systems, and/or image printing systems, it is desirable for the system to identify the class to which an individual image belongs without the manual intervention of an observer. Image classification results can be used to selectively apply image enhancements differently to different classes of images. For example, it is usually not desirable to adjust the color balance of any images that belong to the class of monochromatic images. As another example, it might be desirable to direct digital images of different classes to different digital storage locations in an image management system. Likewise, it might be desirable to print all digital images classified as black-and-white on a different hardcopy printer than the hardcopy printer chosen to print RGB color digital images, or to choose a different set of printer inks or toners to print digital images classified as black-and-white or monochromatic as opposed to images classified as RGB color digital images on a single printer.

Using mathematical methods to determine if individual pixels of a RGB digital image are neutral or nearly-neutral have been described in prior art. The value for each color component of a pixel can be compared directly to the other two components, or the RGB pixel values can be converted to an orthogonal color space, consisting of a single luminance (brightness or lightness) value and two chrominance (color difference) values, followed by a comparison of the two chrominance values of the pixel. Example orthogonal color spaces include the CIELAB and CIELUV color spaces. Pixels having chrominance values equal to zero (i.e., at the origin of the chrominance plane) have no color content, and are determined to be neutral. Such would be the expected outcome if the pixels in a RGB color digital image are converted to black-and-white using computer software.

Pixels with both chrominance values close to zero are determined to be nearly-neutral when the absolute values of the chrominance values are within a programmable threshold from the origin of the chrominance plane. Detecting nearly-neutral pixels is advantageous when the original RGB digital image had been generated, for example, by scanning a black-and-white hardcopy image with a RGB color scanner, the output RGB digital signals of which include quantized electronic noise from the analog RGB signals produced by the scanner.

It is a simple extension of these operations to calculate the fraction of the total number of pixels in a RGB digital image that are neutral and/or nearly-neutral, and from that determination, to classify the RGB image as a black-and-white image, or a partially black-and-white image, indicative of a black-and-white image with spot color content.

A computer-based method to identify monochromatic digital images that are not black-and-white requires additional mathematical operations, analysis and classification methods. A monochrome digital image typically does not contain neutral RGB pixels, especially in the range of lightness levels excluding the minimum and maximum ranges. Furthermore, each non-neutral RGB pixel in a monochrome digital image will have a color hue characteristic similar to all other RGB pixels in the same monochrome digital image. Images traditionally classified as "sepia-toned" are a subset of the total class of monochrome images. Sepia-toned images are known for their characteristic hue. Monochromatic hues typically associated with sepia images range from yellowish brown to reddish brown. Sepia-toned RGB digital images are readily generated by scanning original sepia-toned photographs using an RGB scanner, or by using computer software to convert an original RGB color digital image or black-and-white digital image to a sepia-toned RGB image.

The dominant hue characteristic of monochrome images has been discussed in prior art, and U.S. Pat. No. 6,580,824 discloses a method to detect if a RGB digital image had been created by scanning a sepia-toned print image. The invention described by U.S. Pat. No. 6,580,824 pertains to determining the probability that a digital image is sepia-toned. No provision is understood to be included to determine if an image is monochromatic with a hue other than traditional sepia. The mechanism by which U.S. Pat. No. 6,580,824 detects a sepia image is understood to be wholly based on independently determining the hue of each of the individual pixels in the image, and comparing that hue value to a predetermined range of hues and saturations associated with sepia tones. The utility of this method is understood to be limited to the detection of traditional sepia-toned RGB digital images, and it is understood to require the predetermination of a range of hue and saturation values to define the limits of sepia color space. Further, it is understood to require the use of an algorithm "training" operation, using a pre-selected population of sepia-toned RGB digital images, to define the relevant range of the hue and saturation values that represent real sepia-toned RGB image pixel values, so that the determined range can be used in the subsequent classification of pixels from input RGB digital images of unknown classification. A disadvantage of this method is apparent if a sepia-toned RGB digital image with dominant sepia tones outside of the hue and saturation limits defined by the training set of sepia-toned images is analyzed by the described method. In this case, the sepia-toned RGB digital image would not be classified as sepia-toned. The method described by U.S. Pat. No. 6,580,824 can be extended to detect and separately classify monochromatic RGB digital images having monochromatic hues different from those associated with traditional sepia-toned monochromatic images, provided that a pre-selected population of the appropriate monochromatic RGB digital images has been used to train the algorithm.

With the rapid growth in the number of sources for RGB digital images and the number of computer-based RGB digital image enhancement methods, a need has emerged for a computer-based method to identify those RGB digital images that are black-and-white or generally monochromatic, so that subsequent image processing methods are chosen appropriately, depending upon the identified classification of the RGB digital images. Furthermore, it is generally recognized that black-and-white images with spot color and monochromatic images with spot color are members of subclasses of the black-and-white and monochromatic image classes, respectively, and as such must be distinguished from otherwise full-color RGB digital images. Therefore, a need exists for classifying RGB digital images into exclusive classes of black-and-white, monochromatic, black-and-white with spot color, monochromatic with spot color and full-color RGB image classes with reduced or no user interaction.

SUMMARY

The above-described problem is addressed and a technical solution is achieved in the art by a method for identifying the class to which a digital image belongs, according to various embodiments of the present invention. For example, embodiments of the present invention pertain to such a method implemented at least in part by a computer system, the method including receiving a digital image, analyzing the pixels of the digital image to determine if the digital image is black-and-white or black-and-white with spot color; and if not so classified, further analyzing the digital image by grouping each pixel according to its calculated lightness level value, calculating statistical values from the sample population distributions of the two color difference values for each said lightness level group, and analyzing the statistical values to determine if the digital image is monochromatic or monochromatic with spot color.

According to an embodiment of the present invention, the image classification process described above selects a subset of pixels for analysis from the input digital image. In these instances, the decision to select a pixel is made dependent upon the size of the input digital image and the spatial location of the pixel in the input digital image.

In some embodiments of the present invention, an analysis of the characteristics of the input digital image is completed before any classification decision is made. In these instances, all image statistics are generated for the input digital image.

In other embodiments of the present invention, a first process step generates a first subset of image statistics from the input digital image and a first statistical comparison test is performed to determine if the image can be classified; and if no classification is possible after the first test, a second process step generates a second subset of image statistics from the input digital image and a second statistical comparison test is performed to complete the image classification.

According to an embodiment of the present invention, the RGB component values of pixels selected for analysis are transformed to a lightness value and two color difference values, and the selected pixels are sorted into groups according to their calculated lightness level values. In this instance, statistics for the pixel population in each lightness level group are generated from the first color difference values and the second color difference values of all pixels in said lightness level group.

According to an embodiment of the present invention, the statistics generated from the first color difference value and the second color difference value for each lightness level group are further transformed to a mean color hue angle value and a mean color saturation value for each lightness level group.

According to an embodiment of the present invention, the statistics for each lightness level group are combined together into another group, and a set of image statistics are generated from the combined group.

In some embodiments of the present invention, the calculated statistics for each lightness level group are assigned weights based upon an average group pixel lightness level prior to the calculation of the set of image statistics.

According to an embodiment of the present invention, the image statistics include descriptors of the variability of the mean color hue angle for all included lightness level groups; descriptors of the variability of the two color difference values within each lightness level grouping; and, descriptors of the normality of the sample population distribution of each color difference value within each lightness level grouping. In this embodiment, the relative magnitudes of said statistical values are used to determine the classification of the input digital image. In such an instance, if the input digital image is classified as monochromatic as a result of the statistical analysis, the mean color hue of the input digital image is used to further determine the subclass of monochromatic digital images to which said input digital image belongs.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which:

FIG. 8a illustrates the RGB component values for an array of color RGB digital image pixels and FIG. 8b illustrates the pixel lightness value and two color difference values for the same array of pixels;

FIG. 9a illustrates the RGB component values for an array of monochromatic RGB digital image pixels and FIG. 9b illustrates the pixel lightness value and two color difference values for the same array of pixels; and FIG. 10a illustrates the RGB component values for an array of monochromatic RGB digital image with spot color pixels and FIG. 10b illustrates the pixel lightness value and two color difference values for the same array of pixels.

It is to be understood that the attached drawings are for purposes of illustrating the concepts of the invention and may not be to scale.

DETAILED DESCRIPTION

Various embodiments of the present invention pertain to classifying still digital images with little or no user intervention. It should be noted that, unless otherwise explicitly noted or required by context, the word "or" is used in this disclosure in a non-exclusive sense.

Figure 1:
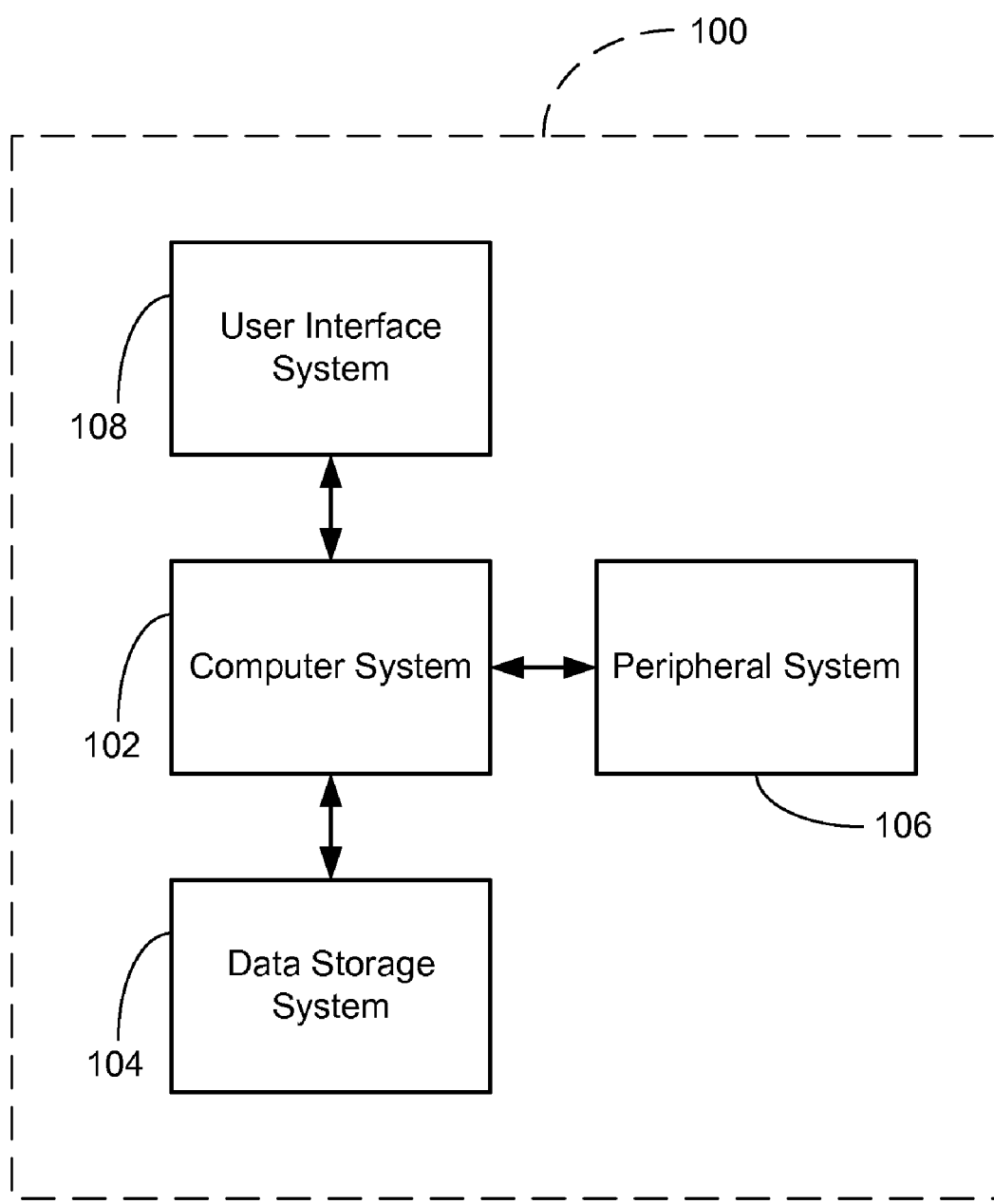
FIG. 1 illustrates a system for classifying a digital image, according to an embodiment of the present invention.

FIG. 1 illustrates a system for facilitating still digital image classification, according to an embodiment of the present invention. The system 100 includes a computer system 102, a peripheral system 106, a user interface system 108, and a data storage system 104. The data storage system 104, the peripheral system 106, and the user interface system 108 are communicatively connected to the computer system 102. The computer system includes one or more computers communicatively connected that implement the processes of the various embodiments of the present invention, including the example processes of FIGS. 2-7 described herein.

The term "computer" is intended to be a synonym for or include any data processing device, such as a central processing unit ("CPU"), a desktop computer, a laptop computer, a mainframe computer, a personal digital assistant, a Blackberry™, a digital camera, or any other device for processing data, managing data, or handling data, whether implemented with electrical, magnetic, optical, biological components, or otherwise.

The data storage system 104 includes one or more computer-accessible memories configured to store the information needed to execute the processes of the various embodiments of the present invention, including the example processes of FIGS. 2-7 described herein. The data-storage system 104 may be a distributed data-storage system including multiple computer-accessible memories communicatively connected to the computer system 102 via a plurality of computers and/or devices. On the other hand, the data storage system 104 need not be a distributed data-storage system and, consequently, may include one or more computer-accessible memories located within a single computer or device.

The phrase "computer-accessible memory" is intended to include any computer-accessible data storage device, whether volatile or nonvolatile, electronic, magnetic, optical, or otherwise, including but not limited to, floppy disks, hard disks, Compact Discs, DVDs, flash memories, ROMs, and RAMs.

The phrase "communicatively connected" is intended to include any type of connection, whether wired, wireless, or both, between devices, and/or computers, and/or programs in which data may be communicated. Further, the phrase "communicatively connected" is intended to include a connection between devices and/or programs within a single computer, a connection between devices and/or programs located in different computers, and a connection between devices not located in computers at all. In this regard, although the data storage system 104 is shown separately from the computer system 102, one skilled in the art will appreciate that the data storage system 104 may be stored completely or partially within the computer system 102. Further in this regard, although the peripheral system 106 and the user interface system 108 are shown separately from the computer system 102, one skilled in the art will appreciate that one or both of such systems may be stored completely or partially within the computer system 102.

The peripheral system 106 may include one or more devices configured to provide digital images to the computer system 102. For example, the peripheral system 106 may include still digital cameras, cellular phones, film scanners, print scanners or other computers. The computer system, upon receipt of digital image from a device in the peripheral system 106, may store such digital image in the data storage system 104.

The user interface system 108 may include a mouse, a keyboard, a mouse and a keyboard, or any device or combination of devices from which data is input to the computer system 102. In this regard, although the peripheral system 106 is shown separately from the user interface system 108, the peripheral system 106 may be included as part of the user interface system 108.

The user interface system 108 also may include a display device, a plurality of display devices (i.e. a "display system"), a computer accessible memory, one or more display devices and a computer accessible memory, or any device or combination of devices to which data is output by the computer system 102.

Figure 2:
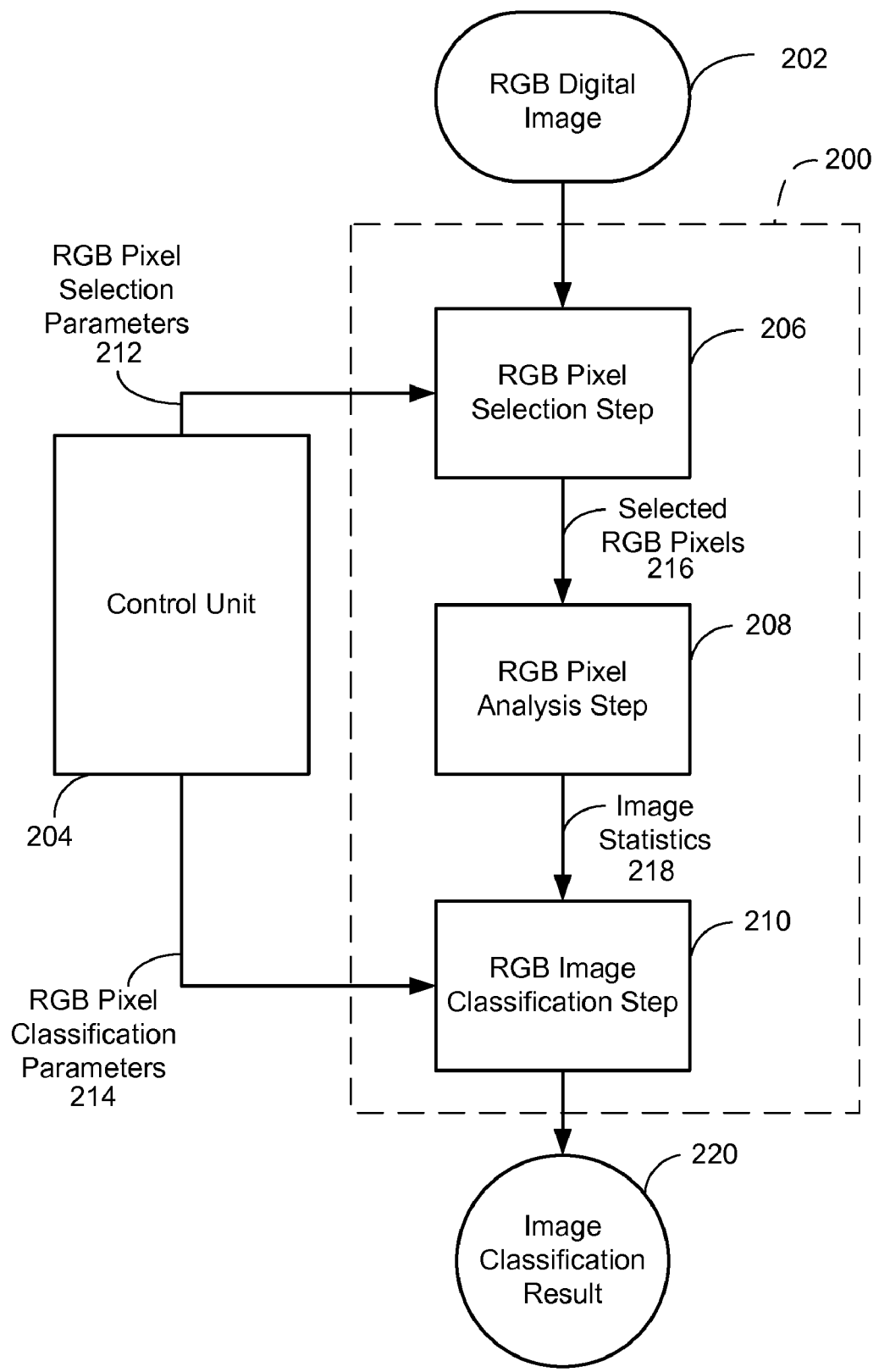
FIG. 2 illustrates a process for classifying a digital image, according to an embodiment of the present invention.

FIG. 2 illustrates a process 200 for classifying an input RGB digital image, according to an embodiment of the present invention. The process 200 receives a RGB digital image 202 from either the data storage system 104 or the peripheral system 106 and provides the digital image 202 to a RGB pixel selector step 206. A control unit 204, implemented as software, firmware, or hardware in the computer system 102, provides RGB pixel selection parameters 212 to the RGB pixel selection step 206, which in turn provides selected RGB pixels 216 from the RGB digital image 202 to a RGB pixel analysis step 208. The RGB pixel analysis step 208 counts the total number of selected pixels and the number of selected pixels that are neutral, calculates a lightness value and two color difference values from each selected pixel, counts the number of selected pixels that are near-neutral and groups all the selected pixels according to lightness level. The RGB pixel analysis step 208 also calculates the fractional amount of neutral pixels and near-neutral pixels in the total sum of selected pixels, analyzes the distribution of the two color difference values of all selected pixels for each lightness level group, calculates a series of statistics descriptive of the color difference value distributions in each lightness level group, calculates a series of statistics descriptive of the calculated statistics for all the lightness level groups, and provides the calculated image statistics 218 to a RGB image classification step 210. The RGB image classification step 210 also receives RGB image classification control parameters 214 from the control unit 204. The RGB image classification step assigns an image classification result 220 for the input RGB digital image 202, based upon a comparison of the calculated image statistics 218 to the image classification control parameters 214.

In an embodiment of the present invention, the RGB pixel selection parameters 212 instruct the RGB pixel selection step 206 to include in the subsequent pixel analysis only those pixels in a user-adjustable or a predefined central portion of the input RGB digital image 202. Exclusion from the analysis of pixels at or near the edges of the digital image prevents erroneous digital pixel data originated by, for example, overscanning the physical edges of a hardcopy print image, from adversely affecting the analysis results. In another embodiment of the present invention, the RGB pixel selection parameters 212 instruct the RGB pixel selection step 206 to reduce the total number of selected pixels for analysis by discrete subsampling the input RGB digital image 202 or by otherwise reducing the pixel dimensions of the input RGB digital image 202 by any one of a plurality of digital image resampling methods. In a preferred embodiment of the present invention, input RGB digital images containing more than 200,000 total pixels are resampled to a range of 100,000 to 200,000 total pixels before analysis.

In a preferred embodiment of the present invention, the total lightness range is divided into between 50 and 100 lightness level groups.

In another embodiment of the present invention, lightness level groups containing a low number of pixels relative to the average number of pixels in all lightness groups are considered to be under-populated, and the statistic values for those groups are excluded from the calculations for image statistics.

In another embodiment of the present invention, the statistic values for each lightness level group are weighted according to a function of the mean lightness level in each lightness level group prior to the calculations for the image statistics.

Figure 3:
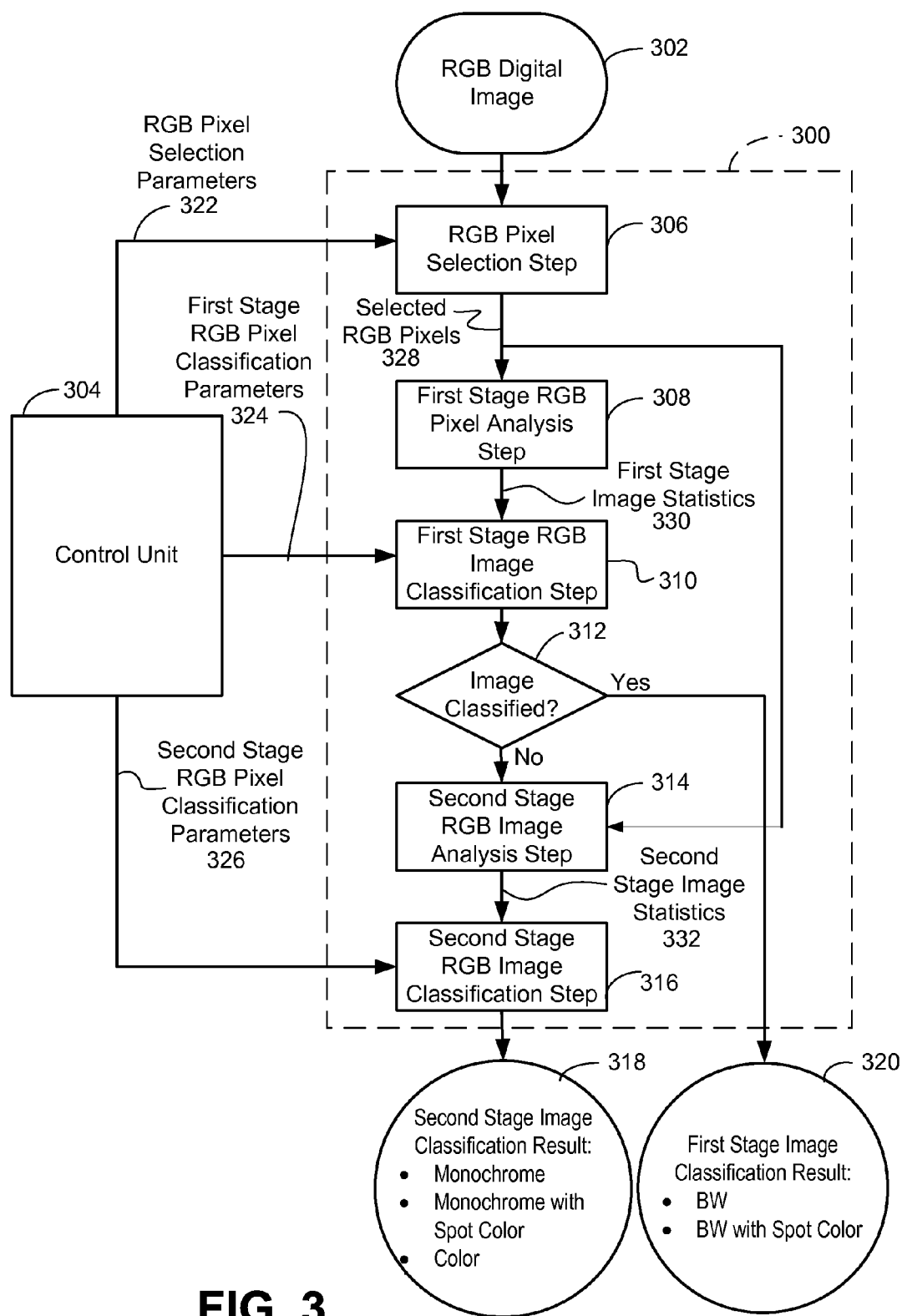
FIG. 3 illustrates, among other things, a two-stage process for classifying a digital image, according to an embodiment of the present invention.

FIG. 3 illustrates a two-stage process 300 for classifying an input RGB digital image according to an embodiment of the present invention. The process 300 receives a RGB input image 302 from either the data storage system 104 or the peripheral system 106 and provides the digital image 302 to a RGB pixel selector step 306, which also receives RGB pixel selection parameters 322 from the control unit 304, which may be implemented as software, firmware, or hardware in the computer system 102. The selected RGB digital image pixels 328 are provided to a first stage RGB pixel analysis step 308 and to a second stage RGB pixel analysis step 314. The first stage RGB pixel analysis step 308 counts the total number of selected pixels 328 and the number of selected pixels that are neutral, calculates a lightness value and two color difference values for each selected pixel and counts the number of selected pixels that are near-neutral. The first stage RGB pixel analysis step 308 provides the first stage analysis results 330 to the first stage RGB image classification step 310, which also receives the first stage RGB image classification parameters 324 from the control unit 304.

The first stage RGB image classification step 310 calculates the sum of the number of neutral pixels and the number of near-neutral pixels, and compares the result to the total number of selected pixels 328. If the sum of all neutral pixels and near-neutral pixels is equal to the total number of selected pixels, the RGB digital image is classified as black-and-white. If the RGB digital image is not classified as black-and-white, the first stage RGB image classification step 310 calculates a neutral pixel fractional amount by dividing the number of neutral pixels by the total number of selected RGB pixels 328. If the resulting neutral pixel fractional amount is greater than a threshold fractional amount provided as a first stage classification parameter 324, the RGB digital image is classified as black-and-white with spot color. If the RGB digital image is classified as black-and-white or black-and-white with spot color, the image classification 320 is output from the process 300, and a signal is generated to end the process 300. Otherwise, the process 300 activates the second stage RGB pixel analysis step 314.

If activated, the second stage pixel analysis step 314 receives the selected RGB pixels 328 and calculates a lightness value and two color difference values for each selected pixel. The analysis step 314 sorts the selected pixels into groups distinguished by the calculated pixel lightness values. After all the selected pixels are sorted into lightness level groups, the analysis step 314 evaluates the distributions of values of both color difference values for each lightness level group of selected pixels. The analysis step 314 calculates statistics descriptive of the total number and sample population distribution of color difference values in each lightness level group.

After all statistic values are calculated for each lightness level group, the second stage pixel analysis step 314 evaluates the distribution of calculated statistic values of all lightness level groups, calculates an average color hue value for the selected pixels in each lightness level group from the calculated color difference value statistics, and further calculates a reduced number of statistic values descriptive of the consistency of the average color hues and color difference values for the entire set of lightness level groups and the normality of the sample populations of color difference values for the entire set of lightness level groups. Finally this reduced set of second stage image statistics 332 is provided to the second stage RGB image classification step 316, which also receives second stage RGB image classification parameters 326 from the control unit 304.

The second stage RGB image classification parameters 326 include threshold values for the second stage image statistics 332. The second stage RGB image classification step 316 compares a second stage image statistic value related to the consistency of the average color hue for all lightness level groups to a first color hue consistency threshold value, and it compares a second stage image statistic related to the variability of color difference values within each lightness level group to a color difference variability threshold value. If both said second stage image statistic values are equal to or less than the corresponding said threshold values, the RGB digital image is classified as "monochromatic." If either or both said second stage image statistic values are greater than corresponding said threshold values, a second comparison test is performed. In the second comparison test, the second stage image statistic value related to the consistency of the average color hue for all lightness level groups is compared to a second color hue consistency threshold value, and a second stage image statistic value related to the normality of the distributions of the two color difference values in each lightness level groups is compared to a color difference value distribution normality threshold. If the said first statistic in the second comparison test is less than or equal to its corresponding said threshold value and the said second statistic in the second comparison test is greater than or equal to its corresponding said threshold value, the RGB digital image is classified as "monochromatic with spot color." If the second stage image statistics 332 fail both sets of comparison tests in the second stage RGB image classification step 316, the RGB digital image is classified as "color." Finally, the appropriate RGB image classification 318 is output from the process 300, and a signal is generated to end the process 300.

Figure 4:
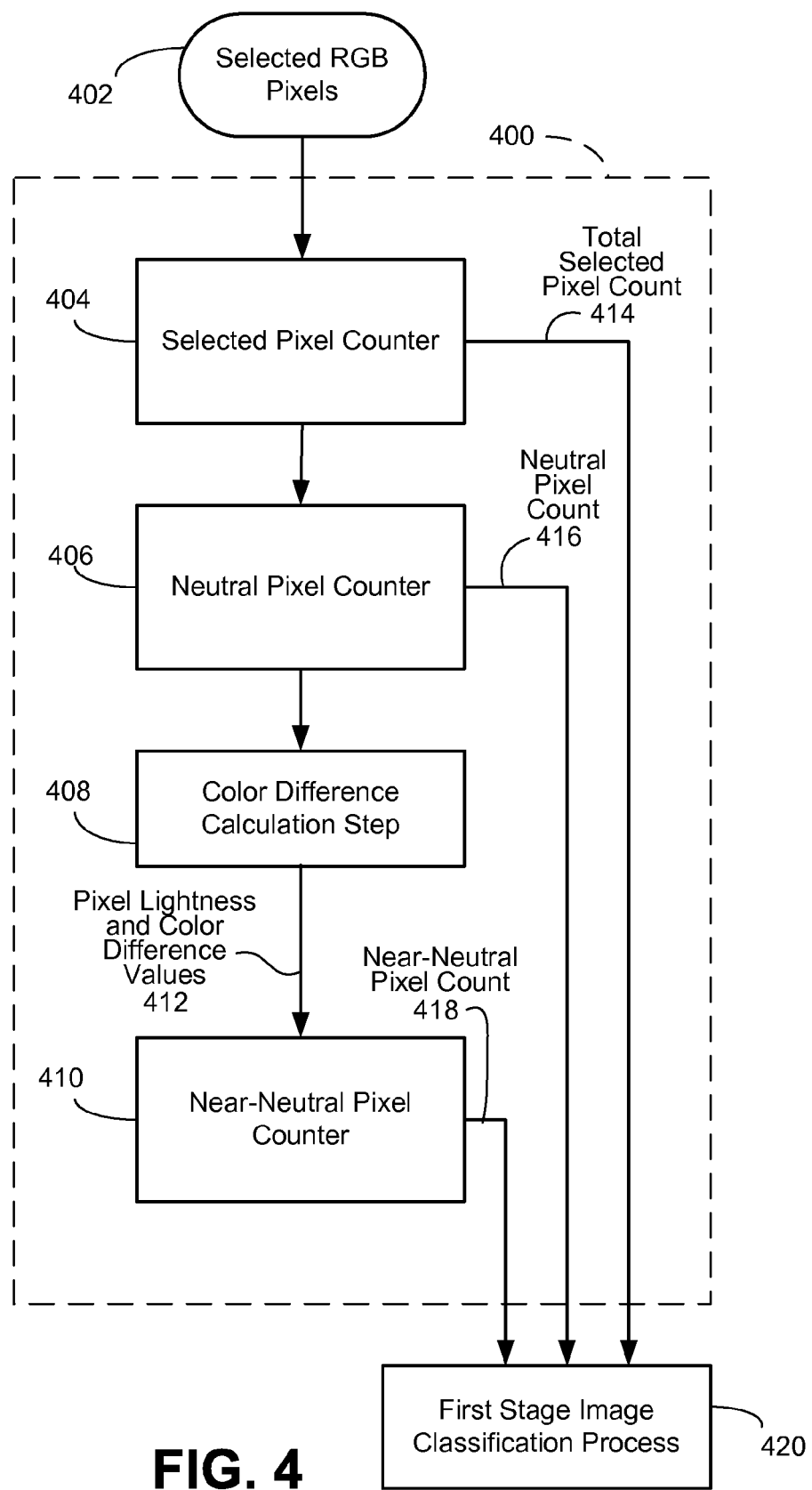
FIG. 4 illustrates a process for analyzing digital image pixels in the first analysis operation of a digital image classification system, according to an embodiment of the present invention.

FIG. 4. illustrates an embodiment of the first stage RGB pixel analysis step 308 as described above. The first stage RGB pixel analysis process 400 receives as input the selected RGB image pixels 402. A selected pixel counter 404 counts each pixel. The selected pixels are passed to a neutral pixel counter 406, which performs a simple test to compare the digital values for the three color components in each pixel. If the digital values for each of the three color components of a pixel are equivalent (R=G=B), the neutral pixel counter value sum is incremented by 1. Otherwise, no change is made to the neutral pixel counter sum. The selected pixels are next passed to a color difference calculation step 408, which transforms the RGB component values for each pixel into an orthogonal color space consisting of a lightness value and two color difference values, in which the lightness value conveys only lightness or brightness information and no color information with respect to the pixel, and the two color difference values convey only color information and no lightness or brightness information with respect to the pixel. Those skilled in the art will recognize that there are many color spaces such as CIELAB and CIELUV that are suitable for this purpose. In an embodiment of the present invention, the following equations, as defined by the ITU-R BT.601 recommendations, are used to transform the pixel RGB component values:

$$L = 0.299 R + 0.587 G + 0.114 B$$
$$C_b = -0.169 R - 0.331 G + 0.500 B$$
$$C_r = 0.500 R - 0.419 G - 0.081 B$$

where L is the transformed lightness value for the pixel and $C_b$ and $C_r$ are the two transformed color difference values for the pixel. For input RGB digital images encoded with 8 bits per color component, the input data range is [0:255]. The corresponding floating point output range for the lightness value L is [0.0:255.0] and the corresponding floating point output range for the color difference values, $C_b$ and $C_r$, is [-127.5: 127.5]. The RGB pixel values for a perfectly neutral pixel will therefore have transformed $C_b$ and $C_r$ values equal to zero. Pixel values for non-neutral pixels will have at least one non-zero color difference value, $C_b$ or $C_r$. For example, the following table shows the transformed L $C_b$ $C_r$ values for sample input RGB pixel values:

TABLE 1

| Sample RGB pixel values | | | | | | |
|---|---|---|---|---|---|---|
| Sample Number | R | G | B | L | $C_b$ | $C_r$ |
| 1 | 105 | 105 | 105 | 105 | 0 | 0 |
| 2 | 124 | 125 | 123 | 124.47 | -0.83 | -0.34 |
| 3 | 153 | 150 | 149 | 150.78 | -1.01 | 1.58 |
| 4 | 102 | 202 | 11 | 152.32 | -78.60 | -34.53 |
| 5 | 219 | 146 | 0 | 151.18 | -85.34 | 48.33 |
| 6 | 73 | 255 | 36 | 175.62 | -78.74 | -73.26 |

The color difference calculation step 408 provides the transformed pixel values 412 to the near-neutral pixel counter 410, which compares the $C_b$ and $C_r$ values for each pixel to predefined threshold values. Pixels that are neutral or nearly neutral in color will have transformed values for $C_b$ and $C_r$ that are both equal to zero or are very close to zero. In one embodiment of the present invention, a predefined threshold, $T_n$, is used in a simple comparison test to determine if the pixel is perfectly neutral or nearly neutral:

IF ( ( $-T_n < C_b < T_n$ ) .AND. ( $-T_n < C_r < T_n$ ) ) is true,
   then the pixel is neutral or nearly neutral;
ELSE the pixel is colored.

If said pixel is determined to be neutral or nearly neutral, the near-neutral pixel counter sum is incremented by one. Otherwise, the no change is made to the near-neutral pixel counter sum.

Those skilled in the art will recognize that the above test defines pixel near-neutrality based upon a square region centered upon the origin of the color difference plane. Additional transformations can be performed upon the $C_b$ and $C_r$ pixel color difference values to calculate a single positive color saturation value for the pixel, relative to the origin of the color difference plane, and a single comparison test for said saturation value can be performed against a single threshold $T_n'$ to determine if the pixel is neutral or nearly-neutral. Those skilled in the art will also recognize that the predefined threshold value $T_n$ or $T_n'$ can be made to be dependent upon the pixel lightness value L. Furthermore, the predefined threshold value $T_n$ or $T_n'$ is dependent upon the type of RGB color space encoding used for the RGB digital image. For example, the threshold value $T_n$ or $T_n'$ chosen for use with digital images encoded in the standard sRGB color space should be larger than the threshold value $T_n$ or $T_n'$ chosen for use with digital images encoded in Adobe™ 98 RGB.

Figure 5:
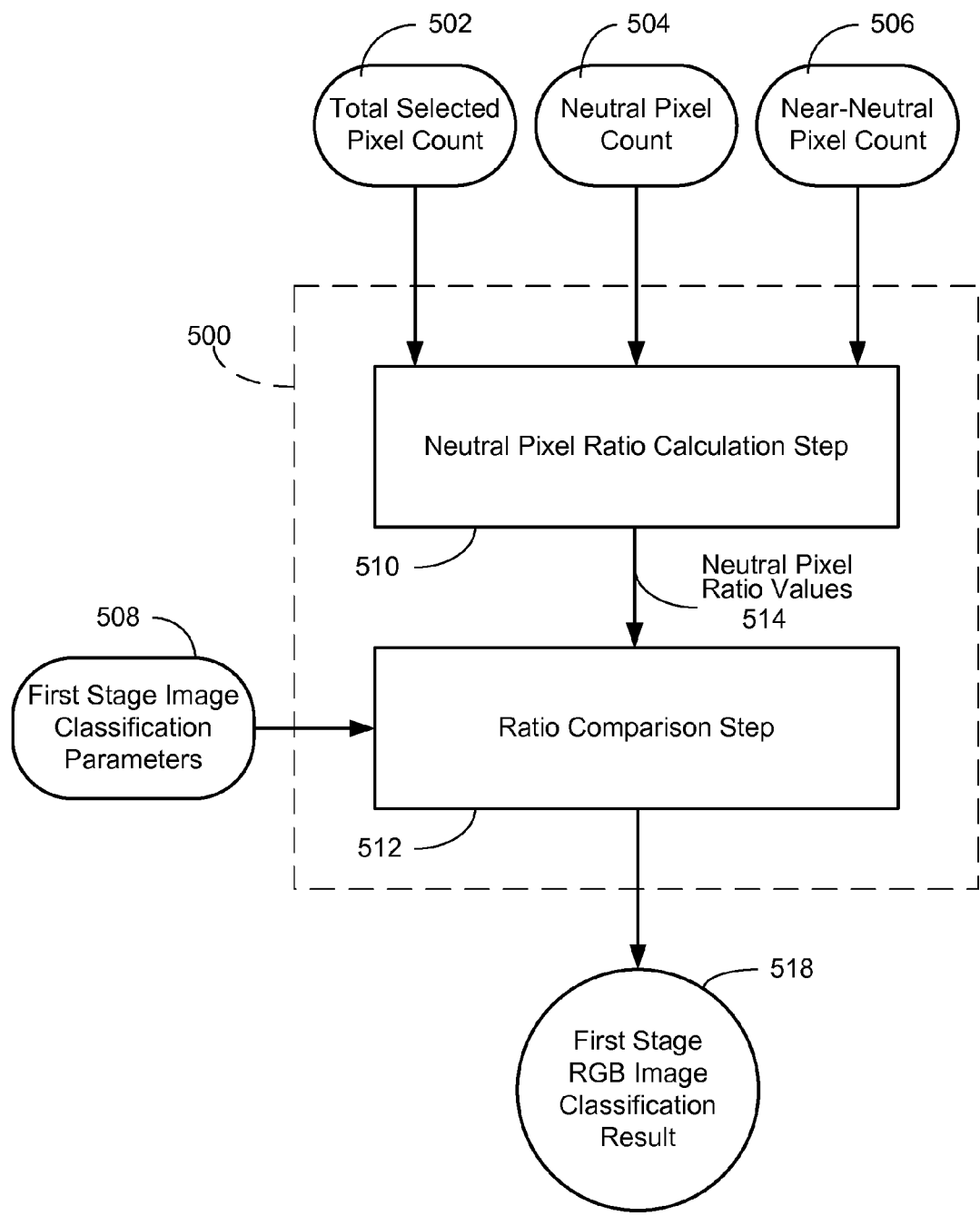
FIG. 5 illustrates a process for classifying a digital image based upon a first operation of digital image pixel analysis, according to an embodiment of the present invention.

When all selected pixels have been tested for neutrality, the values for the total selected pixel count 414, the neutral pixel count 416, and the near-neutral pixel count 418 are output to the first stage image classification step 420. FIG. 5 illustrates an embodiment of the first stage classification step 420. In this embodiment, the first stage classification process 500 receives as input the total selected pixel count 502, the neutral pixel count 504 and the near-neutral pixel count 506 which are provided to the neutral pixel ratio calculation step 510. As described above, the near-neutral pixel count includes all pixels that are perfectly neutral and near-neutral. A ratio $R_{nn}$ is calculated by dividing the near-neutral pixel count 506 by the total selected pixel count 502, and a second ratio $R_{pn}$ is calculated by dividing the neutral pixel count 504 by the total selected pixel count 502. The said neutral pixel ratio values 514 are provided to the ratio comparison step 512, which also receives from the control unit 304 the first stage image classification parameters 508, which include a ratio threshold value $T_{pn}$ for the ratio $R_{pn}$ and a ratio threshold value $T_{nn}$ for the ratio $R_{nn}$. In an embodiment of the present invention, the ratio value $T_{pn}$ is set to 0.50 and the ratio value $T_{nn}$ is set to 1.00. The ratio comparison step 512 first compares the ratio value $R_{nn}$ to the threshold value $T_{nn}$. If the ratio value $R_{nn}$ is greater than or equal to the threshold value $T_{nn}$, the RGB digital image is classified as black-and-white and a signal is sent to the process 300 to indicate that the RGB digital image has been classified. If the ratio value $R_{nn}$ is less than the threshold value $T_{nn}$, the ratio comparison step 512 compares the ratio value $R_{pn}$ to the threshold value $T_{pn}$. If the ratio value $R_{pn}$ is greater than or equal to the threshold value $T_{pn}$, the RGB digital image is classified as black-and-white with spot color and a signal is sent to the process 300 to indicate that the RGB digital image has been classified. If, as a result of said comparison tests, the RGB digital image has not been classified, a signal is sent to the process 300 to proceed to the second stage RGB image analysis process 314.

RGB digital images that have been converted to black-and-white using computer software are likely to produce ratio values of $R_{pn}$ equal to 1.00 and $R_{nn}$ equal to 1.00. However, RGB digital images created by scanning hardcopy black-and-white prints are likely to contain random pixel noise and will likely have ratio values of $R_{pn}$ substantially less than 1.00. Therefore, an appropriate choice for the near-neutral pixel threshold value $T_{nn}$ will ensure that all selected pixels in said black-and-white RGB digital images will be counted as near-neutral pixels, and will ensure that a most selected pixels in a color RGB digital image will be excluded from the near-neutral pixel count. By testing the ratio $R_{nn}$ against a high threshold value $T_{nn}$, the system 500 has a high probability of correctly classifying black-and-white RGB digital images created by computer software and also by print or film scanning.

RGB digital images that are black-and-white containing spot color are most likely to have been created using computer software. The neutral pixels in said images are therefore most likely to be perfectly neutral, with pixel component values R=G=B. Said pixels will be included in the neutral pixel count 504, and the ratio $R_{pn}$ will accurately represent the fraction of the said image that is black-and-white. In the embodiment of the present invention described above, a value of 0.50 for the ratio threshold value $T_{pn}$ will ensure that RGB digital images with at least 50 percent of selected pixels being perfectly neutral will be classified as black-and-white with spot color.

Figure 6:
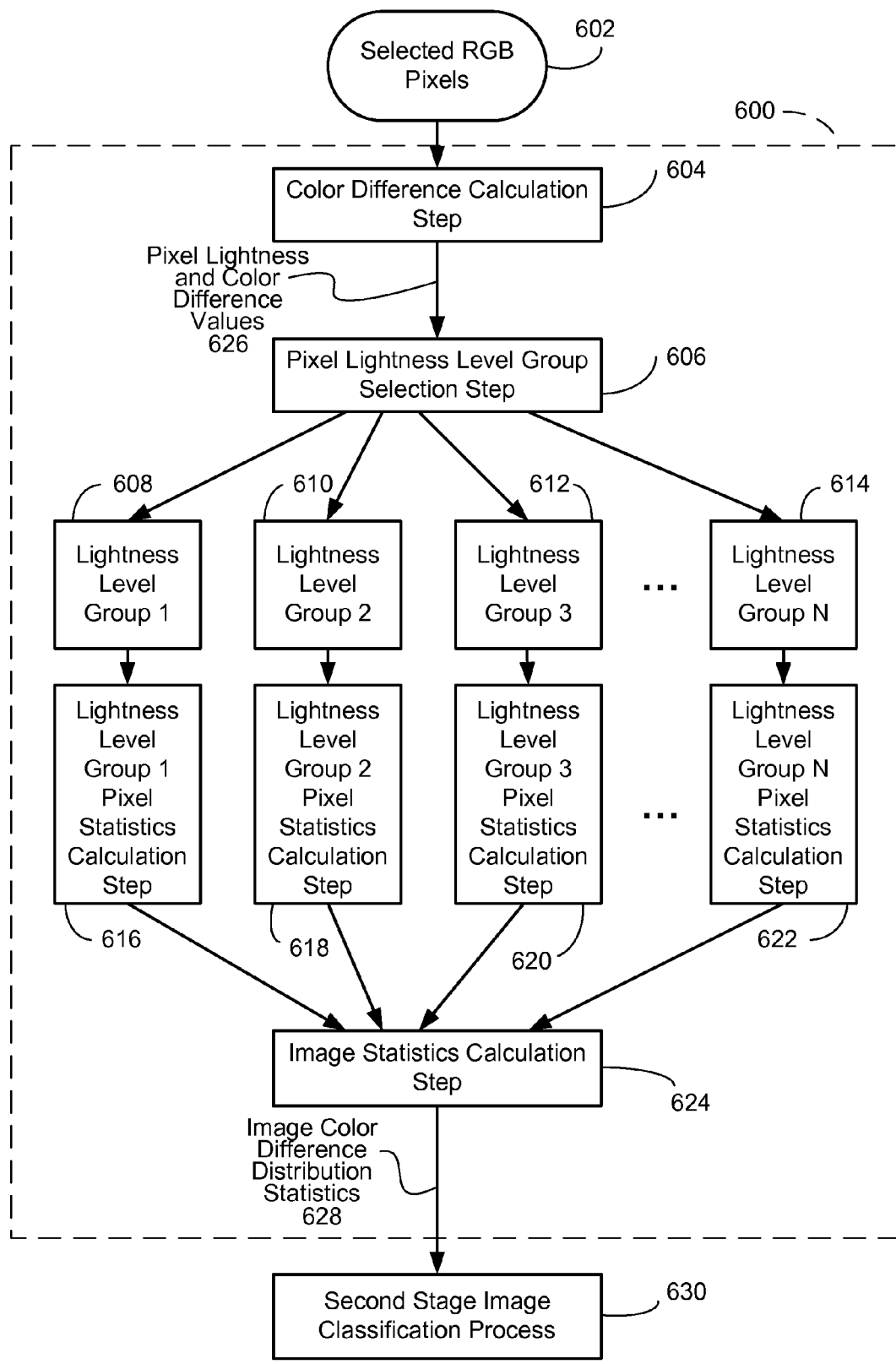
FIG. 6 illustrates a process for analyzing digital image pixels in a second analysis operation of a digital image classification system, according to an embodiment of the present invention.

If the RGB digital image has not been classified as black-and-white or as black-and-white with spot color by the first stage RGB image classification step 310, the two-stage RGB digital image classifier system 300 proceeds to provide the selected RGB pixels 328 to the second stage RGB image analysis step 314. FIG. 6 illustrates an embodiment of the second stage RGB image analysis system 600. Selected RGB pixels 602 are input to a color difference calculation step 604, which performs the same pixel value transformations from RGB component values to a lightness value and two color difference values as described above. Those skilled in the art will recognize that an embodiment of the present invention could include a data buffer to store the results of the first stage color difference calculation step 408 for use in the second stage RGB image analysis system 600, thereby allowing the omission of the second stage color difference calculation step 604. The selected pixel lightness and color difference values 626 are input into a pixel lightness level group selector 606, which sorts each selected pixel into one of a plurality of groups of pixels, each group being distinguished from all other groups by the range of possible pixel lightness values included in said group. In an embodiment of the present invention, for example, with the range of pixel lightness values extending from 0.0 to 255.0, the first lightness level group 608 includes all selected pixels with calculated lightness values less than 5.0; the second lightness level group 610 includes all selected pixels with calculated lightness values greater than or equal to 5.0 but less than 10.0; the third lightness level group 612 includes all selected pixels with calculated lightness values greater than or equal to 10.0 but less than 15.0; and so on, with the last lightness level group 614 including all selected pixels with lightness value greater than or equal to 250.0.

After all selected pixels have been sorted into lightness level groups, statistical analysis of the two color difference values for all the pixels in each lightness level group is performed. Referring to FIG. 6, the pixel color difference values for the pixels in the first lightness level group 608 are input to the first lightness level group pixel statistics calculation step 616; the pixel color difference values for the pixels in the second lightness level group 610 are input to the second lightness level group pixel statistics calculation step 618; and so on, and the pixel color difference values for the pixels in the last lightness level group 614 are input to the last lightness level group pixel statistics calculation step 622.

In each lightness level group pixel statistics calculation step 616, 618, 620, 622, statistics are calculated using standard mathematical methods to describe the population distribution of each of the two color difference values for all the selected pixels included in said lightness level group. Statistic values calculated include, but are not necessarily limited to, the population mean or average, standard deviation, variance, range and fourth moment of the population distribution of each color difference value. Additional derivative values are calculated from said calculated statistic values to more fully describe the histogram shape and normality of the two color difference value population distributions. In an embodiment of the present invention, the maximum absolute value deviance from the average first color difference value is determined from the population of first color difference values; the maximum absolute value deviance from the average second color difference value is determined from the population of second color difference values; and a single deviance value representing the maximum color difference deviation from the average color difference values of the population is calculated by mathematically combining the said two maximum absolute value deviance values. In another embodiment of the present invention, the calculated standard deviation and fourth moment of each color difference value population distribution are used to estimate the kurtosis of each color difference value population distribution, and the said two estimated kurtosis values are mathematically combined into a single value representing the normality of the color difference value population distributions. In yet another embodiment of the present invention, the two calculated color difference value averages in each lightness level group are further converted using standard mathematical methods from their orthogonal Cartesian coordinate values to polar coordinate values to calculate a mean color hue angle value and color saturation value for the lightness level group.

FIG. 8a illustrates the RGB values for an example set of selected RGB pixels 602 selected from a color RGB image and FIG. 8b illustrates the corresponding lightness and color difference (L $C_b$ $C_r$) values 626 calculated from each selected RGB pixel value using the ITU-R BT.601 equations. From examination of the L values in FIG. 8b, it is shown that these example selected pixel values all have values for L between 120 and 125, and as such could be included in the same lightness level group. Using standard mathematical methods, the calculated statistics and their derivatives for the pixel values in FIG. 8b are shown in Table 2:

TABLE 2

Example Color Difference Value Statistics for a Color RGB Digital Image

|  | $C_b$ | $C_r$ | Combined |
|---|---|---|---|
| Mean | −6.85 | 10.28 |  |
| Standard Deviation | 37.07 | 52.68 |  |
| Minimum | −69.51 | −88.08 |  |
| Maximum | 6.20 | 94.73 |  |
| Range | 133.71 | 182.81 |  |
| Maximum Positive Deviation from Mean | 71.05 | 84.45 |  |
| Maximum Negative Deviation from Mean | −62.66 | −98.37 |  |
| Maximum Absolute Deviation from Mean | 71.05 | 98.37 |  |
| Color Difference Fourth Moment | 3829203 | 15893055 |  |
| Color Difference Kurtosis | 2.03 | 2.06 |  |
| Maximum Deviance |  |  | 121.3 |
| Combined Kurtosis |  |  | 2.89 |
| Group Mean Hue Angle (radians) |  |  | 2.16 |
| Group Mean Color Saturation |  |  | 12.35 |

The fourth moment value of a sample population is calculated by the equation $$M4 = \{\Sigma_N (x_n \mu_x)^4\}/N$$

where
  $x_n$ is a member of the sample population
  $\mu_x$ is the mean of the sample population
  $N$ is the total number of samples in the population
The kurtosis value of a sample population is estimated by the equation $$K = M_4/(\sigma_x^4)$$

where
  $M_4$ is the fourth moment value of the sample population
  $\sigma_x$ is the standard deviation value of the sample population
The Maximum Deviance value is calculated by the equation $$D_{mx} = (D_{Cb}^2 + D_{Cr}^2)^{0.5}$$

where
  $D_{Cb}$ is the Maximum Absolute Deviation from Mean for the first color difference value
  $D_{Cr}$ is the Maximum Absolute Deviation from Mean for the second color difference value
The Combined Kurtosis value is calculated by the equation $$K_c = (K_{Cb}^2 + K_{Cr}^2)^{0.5}$$

where
  $K_{Cb}$ is the estimated Kurtosis value for the first color difference value
  $K_{Cr}$ is the estimated Kurtosis value for the second color difference value
The calculated statistical values describe the overall variability of the two color difference values for the selected lightness level group. The standard deviation value, range and calculated maximum deviance value for each color difference value population are used in part by an embodiment of the present invention to determine if an input RGB digital image is monochromatic. Low numerical values for these statistics are indicative of a monochromatic RGB digital image.

It is expected, for a typical color RGB digital image, that the population distribution of each color difference for each lightness level group will be approximately normally distributed about its mean value. The estimated kurtosis value is a measure of the "non-normality" of the population distribution. For normally-distributed sample population distributions, the estimated kurtosis value will be very close to zero. As the distribution of a sample population increasingly deviates from normality, the estimated kurtosis value will become larger. In monochromatic images with spot color, it is expected that the population distribution for at least one of the two color difference values for at least one or more lightness level groups will be significantly non-normal. In such a color difference value population distribution, the color difference values for the monochromatic pixels will be closely clustered near the mean of the population distribution, and the color difference values for the spot color pixels will be significantly different than the mean of the population distribution. For such a population distribution, the estimated kurtosis value will be significantly non-zero. The calculated combined kurtosis value is used in part by an embodiment of the current invention to determine if an input RGB digital image is monochromatic with spot color. High numerical values for the calculated combined kurtosis value are indicative of a monochromatic RGB digital image with spot color.

FIG. 9a illustrates the RGB values for an example set of selected RGB pixels 602 selected from a monochromatic RGB image and FIG. 8b illustrates the corresponding lightness and color difference (L $C_b$ $C_r$) values 626 calculated from each selected RGB pixel value using the ITU-R BT.601 equations From examination of the L values in FIG. 9b, it is shown that these example pixel values all have values for L between 120 and 125, and as such could be included in the same lightness level group. A further examination of the example pixel values in FIG. 9 shows that the number of unique pixel values in the example set is small, with many repetitions of unique pixel RGB in the sample set, due to the required monochromaticity. Very few unique pixel RGB value combinations exist that simultaneously meet the requirements for a restricted range of color hue values for any given range of pixel lightness levels in a monochromatic RGB digital image.

Using standard mathematical methods, the calculated statistics and their derivatives for the pixel values in FIG. 9b are shown in Table 3:

TABLE 3

Example Color Difference Value Statistics for a Monochromatic RGB Digital Image

|  | $C_b$ | $C_r$ | Combined |
|---|---|---|---|
| Mean | 19.00 | 14.32 |  |
| Standard Deviation | 0.415 | 0.411 |  |
| Minimum | −19.56 | 13.85 |  |
| Maximum | −18.39 | 14.93 |  |
| Range | 1.169 | 1.081 |  |
| Maximum Positive Deviation from Mean | 0.609 | 0.613 |  |
| Maximum Negative Deviation from Mean | −0.560 | −0.468 |  |
| Maximum Absolute Deviation from Mean | 0.609 | 0.613 |  |
| Color Difference Fourth Moment | 0.0549 | 0.0448 |  |
| Color Difference Kurtosis | 1.85 | 1.56 |  |
| Maximum Deviance |  |  | 0.864 |
| Combined Kurtosis |  |  | 2.42 |
| Group Mean Hue Angle (radians) |  |  | 2.50 |
| Group Mean Color Saturation |  |  | 23.79 |

FIG. 10a illustrates the RGB values for an example set of selected RGB pixels 602 selected from a monochromatic RGB digital image with spot color and FIG. 10b illustrates the corresponding lightness and color difference (L C$_b$ C$_r$) values 626 calculated from each selected RGB pixel value using the ITU-R BT.601 equations. The spot color pixels are distinguished from the monochromatic pixels by the bold outlines of their cells. From examination of the L values in FIG. 10b, it is shown that these example pixel values all have values for L between 120 and 125, and as such could be included in the same lightness level group. Using standard mathematical methods, the calculated statistics and their derivatives for the pixel values in FIG. 10b are shown in Table 4:

TABLE 4

Example Color Difference Value Statistics for a Monochromatic RGB Digital Image with Spot Color

|  | C$_b$ | C$_r$ | Combined |
|---|---|---|---|
| Mean | −16.11 | 12.58 |  |
| Standard Deviation | 19.11 | 22.57 |  |
| Minimum | −65.14 | −63.18 |  |
| Maximum | 55.00 | 94.68 |  |
| Range | 120.14 | 157.85 |  |
| Maximum Positive Deviation from Mean | 71.11 | 82.09 |  |
| Maximum Negative Deviation from Mean | −49.03 | −75.76 |  |
| Maximum Absolute Deviation from Mean | 71.11 | 82.09 |  |
| Color Difference Fourth Moment | 1144663 | 2681817 |  |
| Color Difference Kurtosis | 8.58 | 10.33 |  |
| Maximum Deviance |  |  | 108.61 |
| Combined Kurtosis |  |  | 13.43 |
| Group Mean Hue Angle (radians) |  |  | 2.48 |
| Group Mean Color Saturation |  |  | 20.44 |

Referring to FIG. 6, the calculated statistics from each lightness level group pixel statistics calculation step 616 through 622 are input to the image statistics calculation step 624. The image statistics calculation step 624 calculates a reduced set of image color difference statistic values 628 from the said input statistics that in turn are input to the second stage image classification process 630. In an embodiment of the present invention, the statistical mean, minimum, maximum, range and standard deviation of the calculated mean color hue angle from all the lightness level groups is calculated; the statistical mean, minimum, maximum, range and standard deviation of the maximum deviance value from all the lightness level groups is calculated; and the statistical mean, minimum, maximum, range and standard deviation of the combined kurtosis value from all the lightness level groups is calculated. In another embodiment of the present invention, said calculated image statistic values are calculated from weighted values of the individual lightness level group statistic values, said weighting assigned as a function of lightness level. For example, because very dark image pixels and very light image pixels are typically low in color saturation and therefore groups of said very dark pixels and very light pixels might have calculated color difference value statistical mean values relatively close to zero regardless of image class, the lightness level group statistic values for lightness level groups incorporating image pixels with very low lightness values very high lightness values can be given relatively low weightings compared to lightness level group statistic values for lightness level groups incorporating image pixels with mid-range lightness values. In a preferred embodiment of the present invention, lightness level groups for image pixels with calculated lightness values less than 15 or greater than 240 are excluded from the calculation of the mean image color hue angle, and lightness level groups for image pixels with calculated lightness values less than 50 or greater than 205 are excluded from the calculation of the image mean maximum deviance value and the image maximum combined kurtosis value.

Figure 7:
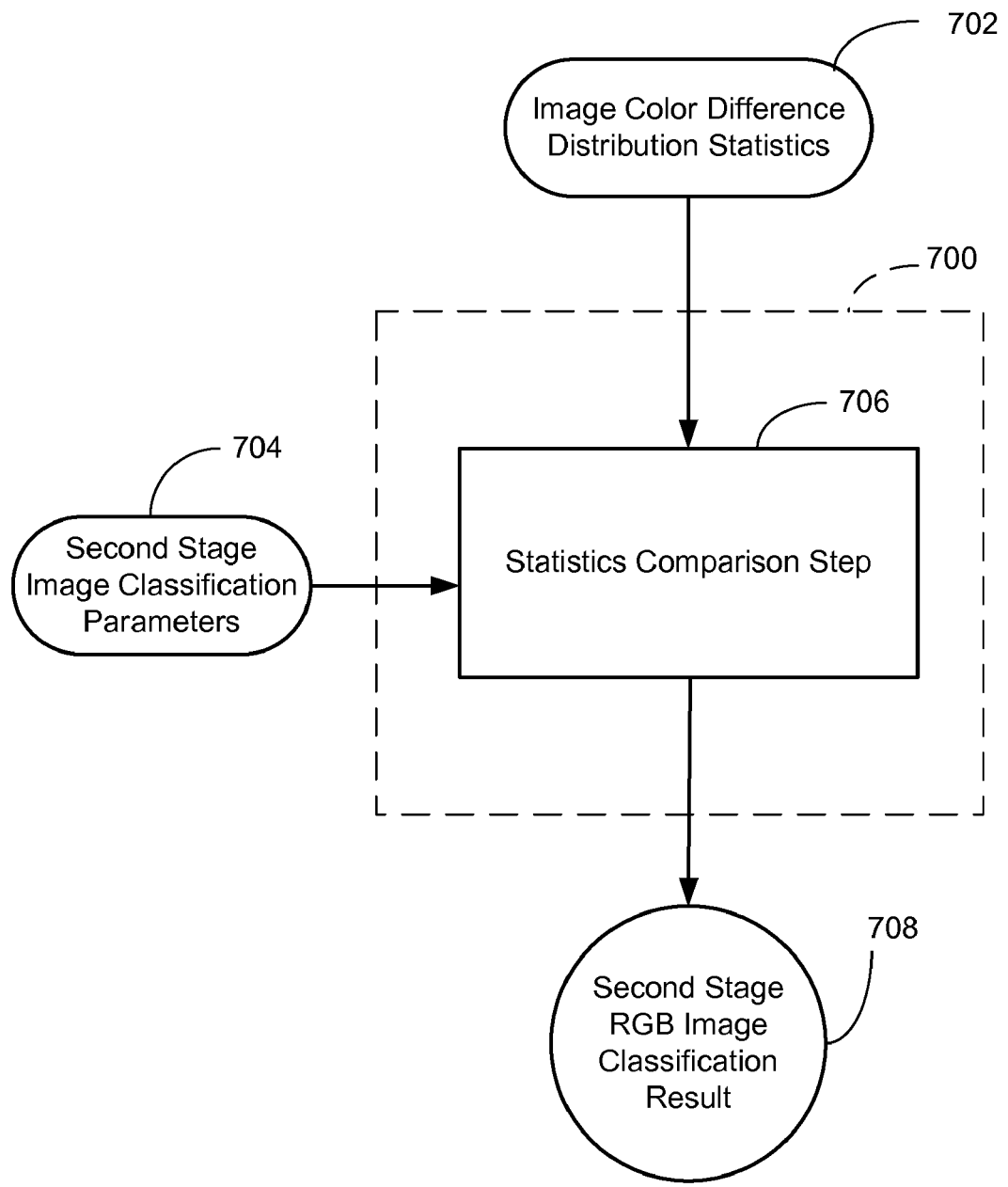
FIG. 7 illustrates a process for classifying a digital image based upon a second operation of digital image pixel analysis, according to an embodiment of the present invention.

FIG. 7 illustrates an embodiment of the second stage image classification step. The second stage classification process 700 receives as input the calculated image color difference statistic values 702, including, but not limited to, the statistical mean ($\mu_h$), minimum value ($\min_h$), maximum value ($\max_h$) and standard deviation ($\sigma_h$) of the calculated mean image color hue angle from all the lightness level groups; the statistical mean ($\mu_D$), minimum value ($\min_D$), maximum value ($\max_D$) and standard deviation ($\sigma_D$) of the image maximum deviance value from all the lightness level groups; and the statistical mean ($\mu_K$), minimum value ($\min_K$), maximum value ($\max_K$) and standard deviation ($\sigma_K$) of the image combined kurtosis value from all the lightness level groups which are input to the statistics comparison step 706, which also receives as input second stage image classification parameters 704. In an embodiment of the present invention, the second stage image classification parameters 704 include a first threshold value, $T_{h1}$, and a second threshold value, $T_{h2}$, for the standard deviation ($\sigma_h$) of the image mean color hue angle; a threshold value, $T_D$, for the mean ($\mu_D$) of the image maximum deviation values; and a threshold value, $T_K$, for the maximum value ($\max_K$) of the image combined kurtosis values.

All lightness level groups with lightness values above the lowest lightness levels in a monochromatic RGB digital image characteristically have nearly consistent average color hue angle values with all other lightness level groups in the said monochromatic RGB digital image. Therefore, it is expected that for a monochromatic RGB digital image, the calculated standard deviation ($\sigma_h$) of the image mean color hue angle will be relatively small compared to that same statistic value calculated for a color RGB digital image. It is also expected that the calculated maximum deviance values for each lightness level group in a monochromatic RGB digital image will be relatively small, and consequently, the calculated mean ($\mu_D$) of the image maximum deviation values compared to said statistic calculated for a color RGB digital image will be relatively small.

It is expected that monochromatic RGB digital image with spot color will have at least one lightness level group that includes colored RGB pixels in addition to a majority of monochromatic RGB pixels. Consequently, the population distributions for the color difference values for said lightness level group(s) are expected to be significantly non-normal, and therefore, the estimated kurtosis value for any said lightness level group will be significantly higher than the estimated kurtosis value for lightness level groups for color RGB digital images containing a normal distribution of color difference values. Therefore, it is expected that the calculated maximum combined kurtosis value ($\max_K$) for monochromatic RGB digital images with spot color will be significantly larger than the calculated maximum combined kurtosis value ($\max_K$) for color RGB digital images.

The expectations with respect to the above described RGB digital image classifications and the corresponding statistical values are supported by examination of said statistical values in Tables 2-4 above. These data show, in a relative sense, the differences in magnitude for the Maximum Deviance value and Combined Kurtosis value among the example selected pixel sets.

Referring to FIG. 7, the statistics comparison step 706 first compares the image mean color hue angle standard deviation value ($\sigma_h$) to the first threshold value $T_{h1}$, and it compares the image mean maximum deviation value ($\mu_D$) to the threshold value $T_D$. If the image mean color hue angle standard deviation value ($\sigma_h$) is less than or equal to the first threshold value $T_{h1}$, and the mean image maximum deviation value ($\mu_D$) is less than or equal to the threshold value $T_D$, the RGB digital image is classified as monochromatic, and a signal is sent to the process 300 to indicate that the RGB digital image has been so classified. In a preferred embodiment of the present invention, the value of the first hue standard deviation threshold value ($T_{h1}$) is set within a range of 3.0 degrees to 5.0 degrees, and the value of the mean image maximum deviation threshold value ($T_D$) is set within a range of 12 to 16.

In an embodiment of the present invention, the image mean color hue angle value ($\mu_h$) is used by the statistics comparison step 706 to further determine the subclass of monochromatic RGB digital images said monochromatic RGB digital image belongs.

If the RGB digital image has not been classified as a result of the first comparison test, the statistics comparison step 706 compares the image mean color hue angle standard deviation value ($\sigma_h$) to the second threshold value $T_{h2}$, and it compares the image maximum kurtosis value ($\max_K$) to the threshold value $T_K$. If the image mean color hue angle standard deviation value ($\sigma_h$) is less than or equal to the second threshold value $T_{h2}$, and the image maximum kurtosis value ($\max_K$) is greater than or equal to the threshold value $T_K$, the RGB digital image is classified as monochromatic with spot color, and a signal is sent to the process 300 to indicate that the RGB digital image has been so classified. In a preferred embodiment of the present invention, the value of the second hue standard deviation threshold value ($T_{h2}$) is set within a range of 6.0 degrees to 9.0 degrees, and the value of the image maximum kurtosis threshold value ($T_K$) is set within a range of 200 to 400.

If the RGB digital image has not been classified as a result of the first or second comparison test, the RGB digital image is classified as color, and a signal is sent to the process 300 to indicate that the RGB digital image has been so classified.

It is to be understood that the foregoing exemplary embodiments are merely illustrative of the present invention, and that many variations of the above-described embodiments can be devised by one skilled in the art without departing from the scope of the present invention. It is therefore intended that all such variations be included within the scope of the following claims and their equivalents.

| PARTS LIST | |
|---|---|
| 100 | System |
| 102 | Computer System |
| 104 | Data Storage System |
| 106 | Peripheral System |
| 108 | User Interface System |
| 200 | Single Stage RGB Digital Image Classifier System |
| 202 | RGB Digital Image Input to System |
| 204 | Control Unit |
| 206 | RGB Pixel Selection Step |
| 208 | RGB Pixel Analysis Step |
| 210 | RGB Image Classification Step |
| 212 | RGB Pixel Selection Parameters |
| 214 | RGB Image Classification Parameters |

| PARTS LIST -continued | |
|---|---|
| 216 | Selected RGB Pixels |
| 218 | Image Statistics |
| 220 | Image Classification Result |
| 300 | Two-stage RGB Digital Image Classifier System |
| 302 | RGB Digital Image Input to System |
| 304 | Control Unit |
| 306 | RGB Pixel Selection Step |
| 308 | First Stage RGB Pixel Analysis Step |
| 310 | First Stage RGB Image Classification Step |
| 312 | Process to determine if image has been classified by the First Stage RGB Image Classification Step |
| 314 | Second Stage RGB Pixel Analysis Step |
| 316 | Second Stage RGB Image Classification Step |
| 318 | Second Stage Image Classification Result |
| 320 | First Stage Image Classification Result |
| 322 | RGB Pixel Selection Parameters |
| 324 | First Stage RGB Image Classification Parameters |
| 326 | Second Stage RGB Image Classification Parameters |
| 328 | Selected RGB Pixels |
| 330 | First Stage Image Statistics |
| 332 | Second Stage Image Statistics |
| 400 | First Stage RGB Pixel Analysis Process |
| 402 | Selected RGB Pixels |
| 404 | Selected Pixel Counter |
| 406 | Neutral Pixel Counter |
| 408 | Color Difference Calculation Step |
| 410 | Near-Neutral Pixel Counter |
| 412 | Pixel Lightness and Color Difference Values |
| 414 | Total Selected Pixel Count |
| 416 | Neutral Pixel Count |
| 418 | Near-Neutral Pixel Count |
| 420 | First Stage Image Classification Process |
| 500 | First Stage Image Classification Process |
| 502 | Total Selected Pixel Count |
| 504 | Neutral Pixel Count |
| 506 | Near-Neutral Pixel Count |
| 508 | First Stage Image Classification Parameters |
| 510 | Neutral Pixel Ratio Calculation Step |
| 512 | Ratio Comparison Step |
| 514 | Neutral Pixel Ratio Values |
| 516 | First Stage RGB Image Classification Result |
| 600 | Second Stage RGB Pixel Analysis Process |
| 602 | Selected RGB Pixels |
| 604 | Color Difference Calculation Step |
| 606 | Pixel Lightness Level Group Selection Step |
| 608 | Lightness Level Group 1 |
| 610 | Lightness Level Group 2 |
| 612 | Lightness Level Group 3 |
| 614 | Lightness Level Group N |
| 616 | Lightness Level Group 1 Pixel Statistics Calculation Step |
| 618 | Lightness Level Group 2 Pixel Statistics Calculation Step |
| 620 | Lightness Level Group 3 Pixel Statistics Calculation Step |
| 622 | Lightness Level Group N Pixel Statistics Calculation Step |
| 624 | Image Statistics Calculation Step |
| 626 | Pixel Lightness and Color Difference Values |
| 628 | Image Color Difference Distribution Statistics |
| 630 | Second Stage Image Classification Process |
| 700 | Second Stage Image Classification Process |
| 702 | Image Color Difference Distribution Statistics |
| 704 | Second Stage Image Classification Parameters |
| 706 | Statistics Comparison Step |
| 708 | Second Stage RGB Image Classification Result |
| 800 | Pixel Array of Color Image RGB Component Values |
| 802 | Key to Pixel RGB Array Values |
| 804 | Pixel Array of Color Image Lightness and Color Difference Values |
| 806 | Key to Pixel Lightness and Color Difference Values |
| 900 | Pixel Array of Monochromatic Image RGB Component Values |
| 902 | Key to Pixel RGB Array Values |
| 904 | Pixel Array of Monochromatic Image Lightness and Color Difference Values |
| 906 | Key to Pixel Lightness and Color Difference Values |
| 1000 | Pixel Array of Monochromatic with Spot Color Image RGB Component Values |
| 1002 | Key to Pixel RGB Array Values |

-continued

PARTS LIST

| 1004 | Pixel Array of Monochromatic with Spot Color Image Lightness and Color Difference Values |
| 1006 | Key to Pixel Lightness and Color Difference Values |

What is claimed is:

1. A method implemented at least in part by a computer system, the method for determining a color classification of a digital image comprising pixels each having at least three color values, and the method comprising the steps of:
    converting the color values of at least some of the pixels to a lightness value, a first color difference value, and a second color difference value, the at least some of the pixels being selected pixels;
    assigning each of the selected pixels to one of a plurality of lightness level groups based at least upon the selected pixel's lightness value;
    using the computer system to calculate, for at least some of the lightness level groups ("selected LLGs"), a first mean of first color difference values and a second mean of second color difference values of corresponding selected pixels;
    using the computer system to calculate, for each of the selected LLGs, a mean color hue angle value from the first mean of the first color difference value and the second mean of the second color difference value; and
    determining whether the digital image is monochromatic based at least upon (a) an analysis of a distribution of the first and second color difference values in each of the selected LLGs with respect to the calculated means, or derivatives thereof, and (b) an analysis of the distribution of mean color hue angle values for all the selected LLGs, or derivatives thereof.

2. The method of claim 1, wherein the analysis of the distributions of the first and second color difference values includes a calculation of a range, a minimum value, a maximum value, a variance, or a standard deviation of each distribution.

3. The method of claim 1, wherein the analysis of the distributions of the first and second color difference values includes a calculation of a range, a minimum value, a maximum value, a variance, and a standard deviation of each distribution.

4. The method of claim 1, wherein the digital image is first analyzed to determine if all of the selected pixels are monochrome pixels of a white, black, or a shade of gray between white and black, based at least upon an analysis of the first and second color difference values for all selected pixels, and wherein the determining step determines whether the digital image is grayscale monochromatic.

5. The method of claim 1, wherein the digital image is first analyzed to determine whether each of a majority of the selected pixels is a monochrome pixel of a white, black, or a shade of gray between white and black, based at least upon an analysis of the first and second color difference values for each selected pixel, and wherein the determining step determines whether the digital image is grayscale monochromatic with a spot accent color.

6. The method of claim 1, wherein the selected pixels comprise only a central portion of the digital image.

7. The method of claim 1, wherein the number of pixels in the digital image is reduced in size prior to any analysis performed as part of the determining step.

8. The method of claim 1, wherein results of the analysis of the distributions of the first and second color difference values in each of the selected LLGs are weighted as a function of an average lightness level for each of the selected LLGs.

9. The method of claim 1, wherein the analysis of the distributions of the first and second color difference values excludes distributions from under-populated selected LLGs.

10. The method of claim 1, wherein a first statistical measure of normality is calculated from the distribution of the first color difference values in each of the selected LLGs, wherein a second statistical measure of normality is calculated from the distribution of the second color difference values in each of the selected LLGs, and wherein the determining step determines whether the digital image is monochromatic with spot accent color based at least upon (a) an analysis of the first statistical measure of normality and the second statistical measure of normality values in each of the selected LLGs, or derivatives thereof, and (b) an analysis of the distribution of mean color hue values for all the selected LLGs, or derivatives thereof.

11. A computer-accessible memory system storing instructions configured to cause a data processing system to implement a method for determining a color classification of a digital image comprising pixels each having at least three color values, wherein the instructions stored on a computer-readable medium comprise:
    instructions for converting the color values of at least some of the pixels to a lightness value, a first color difference value, and a second color difference value, the at least some of the pixels being selected pixels;
    instructions for assigning each of the selected pixels to one of a plurality of lightness level groups based at least upon the selected pixel's lightness value;
    instructions for calculating, for at least some of the lightness level groups ("selected LLGs"), a first mean of first color difference values and a second mean of second color difference values of corresponding selected pixels;
    instructions for calculating, for each of the selected LLGs, a mean color hue angle value from the first mean of the first color difference value and the second mean of the second color difference value; and
    instructions for determining whether the digital image is monochromatic based at least upon (a) an analysis of a distribution of the first and second color difference values in each of the selected LLGs with respect to the calculated means, or derivatives thereof, and (b) an analysis of the distribution of mean color hue angle values for all the selected LLGs, or derivatives thereof.

12. A system comprising:
    a data processing system; and
    a memory system communicatively connected to the data processing system storing instructions configured to cause the data processing system to implement a method for determining a color classification of a digital image comprising pixels each having at least three color values, wherein the instructions stored on a computer-readable medium comprise:
    instructions for converting the color values of at least some of the pixels to a lightness value, a first color difference value, and a second color difference value, the at least some of the pixels being selected pixels;
    instructions for assigning each of the selected pixels to one of a plurality of lightness level groups based at least upon the selected pixel's lightness value;
    instructions for calculating, for at least some of the lightness level groups ("selected LLGs"), a first mean of first color difference values and a second mean of second color difference values of corresponding selected pixels;
instructions for calculating, for each of the selected LLGs, a mean color hue angle value from the first mean of the first color difference value and the second mean of the second color difference value; and
instructions for determining whether the digital image is monochromatic based at least upon (a) an analysis of a distribution of the first and second color difference values in each of the selected LLGs with respect to the calculated means, or derivatives thereof, and (b) an analysis of the distribution of mean color hue angle values for all the selected LLGs, or derivatives thereof.

* * * * *